US 11,303,328 B2

(12) United States Patent
Gao et al.

(10) Patent No.: US 11,303,328 B2
(45) Date of Patent: Apr. 12, 2022

(54) COMMUNICATION METHOD AND APPARATUS, NETWORK DEVICE, TERMINAL DEVICE, AND SYSTEM

(71) Applicant: HUAWEI TECHNOLOGIES CO., LTD., Shenzhen (CN)

(72) Inventors: Dongpei Gao, Xi'an (CN); Kai Chen, Shanghai (CN); Kangsheng He, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/215,384

(22) Filed: Mar. 29, 2021

(65) Prior Publication Data

US 2021/0218442 A1 Jul. 15, 2021

Related U.S. Application Data

(63) Continuation of application No. PCT/CN2018/109153, filed on Sep. 30, 2018.

(51) Int. Cl.
*H04B 7/0456* (2017.01)
*H04B 7/0417* (2017.01)
(Continued)

(52) U.S. Cl.
CPC ......... *H04B 7/0417* (2013.01); *H04B 7/0456* (2013.01); *H04W 24/10* (2013.01); *H04B 7/0634* (2013.01)

(58) Field of Classification Search
CPC ... H01Q 3/38; H04B 7/00; H04B 7/02; H04B 7/04; H04B 7/06; H04B 7/005;
(Continued)

(56) References Cited

U.S. PATENT DOCUMENTS

2010/0238824 A1 9/2010 Farajidana et al.
2010/0323684 A1 12/2010 Cai et al.
(Continued)

FOREIGN PATENT DOCUMENTS

CN 101686500 A 3/2010
CN 102845009 A 12/2012
(Continued)

OTHER PUBLICATIONS

Fujitsu, CSI-RS Design for Virtualized LTE Antenna in LTE-A System. 3GPP TSG-RAN1 #57bis, Los Angeles, CA, USA, Jun. 29-Jul. 3, 2009, R1-092427, 7 pages.
(Continued)

*Primary Examiner* — Shawkat M Ali
(74) *Attorney, Agent, or Firm* — Maier & Maier, PLLC (57) ABSTRACT

A communication method and apparatus, a network device, a terminal device, and a system. The method includes: a network device sends a first reference signal to a terminal device through a first port in a first preset subframe corresponding to a first antenna and sends a second reference signal to the terminal device through the first port in a second preset subframe corresponding to a second antenna. Then, the network device receives first measurement information and second measurement information that are sent by the terminal device, where the first measurement information is measurement information of the first reference signal, and the second measurement information is measurement information of the second reference signal. The network device may determine an antenna weight based on the first measurement information and the second measurement information.

17 Claims, 5 Drawing Sheets

(51) Int. Cl.
*H04W 24/10* (2009.01)
*H04B 7/06* (2006.01)

(58) Field of Classification Search
CPC .. H04B 7/0404; H04B 7/0417; H04B 7/0456; H04B 7/0634; H04B 17/309; H04L 1/00; H04L 1/0026; H04L 5/00; H04L 5/10; H04L 5/0023; H04L 5/0051; H04L 25/0224; H04L 27/26; H04W 4/00; H04W 24/10; H04W 28/02; H04W 28/0263; H04W 72/04; H04W 72/042; H04W 74/00; H04W 76/02
USPC ........ 370/252, 255, 278, 328, 329; 375/219, 375/260, 267, 295, 316; 455/67.11, 422.1
See application file for complete search history.

(56) References Cited

U.S. PATENT DOCUMENTS

| | | |
|---|---|---|
| 2012/0176939 A1 | 7/2012 | Qu et al. |
| 2016/0050153 A1 | 2/2016 | Xu et al. |
| 2016/0088512 A1 | 3/2016 | Bergstrom et al. |
| 2016/0105265 A1* | 4/2016 | Wang .................. H04B 17/309 370/252 |
| 2016/0112167 A1 | 4/2016 | Xu et al. |
| 2016/0143055 A1 | 5/2016 | Nammi et al. |
| 2016/0285652 A1* | 9/2016 | Seo ........................ H04L 5/0057 |
| 2017/0005712 A1 | 1/2017 | Jiang et al. |
| 2018/0062715 A1 | 3/2018 | Li et al. |
| 2019/0097693 A1* | 3/2019 | Park .................... H04B 7/0417 |

FOREIGN PATENT DOCUMENTS

| | | |
|---|---|---|
| CN | 102884751 A | 1/2013 |
| CN | 102938688 A | 2/2013 |
| CN | 103546262 A | 1/2014 |
| CN | 104380649 A | 2/2015 |
| CN | 108418662 A | 8/2018 |

OTHER PUBLICATIONS

3GPP TS 36.331 V15.3.0 (Sep. 2018), 3rd Generation Partnership Project; Technical Specification Group Radio Access Network; Evolved Universal Terrestrial Radio Access (E-UTRA); Radio Resource Control (RRC); Protocol specification (Release 15), 918 pages, Sep. 2018.
AT&T, CSI Enhancements for eMIMO, 3GPP TSG RAN WG1 Meeting #94bis, Chengdu, China, Oct. 8-12, 2018, R1-1810681, 5 pages.

\* cited by examiner

COMMUNICATION METHOD AND APPARATUS, NETWORK DEVICE, TERMINAL DEVICE, AND SYSTEM

CROSS-REFERENCE TO RELATED APPLICATIONS

This application is a continuation of International Application No. PCT/CN2018/109153, filed on Sep. 30, 2018, the disclosure of which is hereby incorporated by reference in its entirety.

TECHNICAL FIELD

Embodiments relate to the communications technologies, and in particular, to a communication method and apparatus, a network device, a terminal device, and a system.

BACKGROUND

A multi-input multi-output (MIMO) system is a system that uses a plurality of transmit antennas and a plurality of receive antennas to transmit and receive signals. In the MIMO system, a network device first sends a reference signal to a terminal before sending downlink data to the terminal, and the terminal performs measurement based on the received reference signal and reports channel state information (CSI) to the network device. The network device selects an appropriate precoding matrix based on the CSI and uses the precoding matrix to send the downlink data to the terminal through an antenna of the network device. For some network devices, a quantity of antenna ports is less than a total quantity of antennas. In this case, CSI received by the network device is CSI corresponding to some antennas, and a gain of a precoding matrix obtained by the network device by using the CSI is reduced.

Therefore, how to obtain a relatively large transmit antenna gain when the quantity of antenna ports is less than the total quantity of antennas is an urgent problem to be resolved.

SUMMARY

A first aspect of the embodiments provides a communication method. The method includes the following.

A network device sends a first reference signal to a terminal device through a first port in a first preset subframe corresponding to a first antenna and sends a second reference signal to the terminal device through the first port in a second preset subframe corresponding to a second antenna. Then, the network device receives first measurement information and second measurement information that are sent by the terminal device. The first measurement information is measurement information of the first reference signal, and the second measurement information is measurement information of the second reference signal. The network device may determine an antenna weight based on the first measurement information and the second measurement information.

According to the method, the network device sends a reference signal in a preset subframe corresponding to an antenna. After receiving the reference signal, the terminal device may determine, based on the subframe in which the reference signal is sent, whether to filter the received reference signal. That is, the terminal device may indirectly learn, based on the subframe in which the reference signal is sent, of antennas using which the reference signal is sent, and then determine whether to filter the reference signal. In this way, a problem that channels of different antennas of the network device cannot be distinguished because the terminal device filters reference signals is avoided. This ensures that the network device can obtain a relatively large transmit antenna gain.

In a possible implementation, the network device may receive the first measurement information by using the following method.

First, the network device determines, based on a receiving moment of the first measurement information and a preset time interval, an identifier of a subframe for sending a reference signal corresponding to the first measurement information. Then, the network device determines that the first measurement information is the measurement information of the first reference signal based on the identifier of the subframe and a correspondence between the subframe and an antenna.

In a possible implementation, the measurement information includes a precoding matrix indicator (PMI).

In a possible implementation, the method further includes:

The network device weights a physical downlink share channel (PDSCH) of the terminal by using the antenna weight.

A second aspect of the embodiments provides a communication method. The method includes the following.

A terminal device receives a first reference signal and a second reference signal that are sent by a network device. The first reference signal is sent by the network device through a first port in a first preset subframe corresponding to a first antenna, and the second reference signal is sent by the network device through the first port in a second preset subframe corresponding to a second antenna. The terminal device measures the first reference signal and the second reference signal based on the first preset subframe and the second preset subframe, to obtain first measurement information corresponding to the first reference signal and second measurement information corresponding to the second reference signal. Then, the terminal device sends the first measurement information and the second measurement information to the network device.

In a possible implementation, the terminal device may measure the first reference signal and the second reference signal in the following manner.

The terminal device determines, based on a measurement subframe set to which the first preset subframe belongs and a measurement subframe set to which the second preset subframe belongs, to perform filtering-based measurement or non-filtering-based measurement on the first reference signal and the second reference signal.

In a possible implementation, the terminal may send the first measurement information in the following manner:

The terminal device sends the first measurement information to the network device based on a receiving moment of the first reference signal and a preset time interval.

In the first aspect and the second aspect, the following possible implementations further exist.

In a possible implementation, the first preset subframe is a subframe in a first measurement subframe set, and the first measurement subframe set includes a plurality of subframes.

According to the method, the terminal device may indirectly learn, based on a measurement subframe set to which a subframe for sending a reference signal belongs and by using a correspondence between the subframe and the measurement subframe set, of an antenna for sending the reference signal. Then, the terminal device may choose not to filter reference signals belonging to different measurement subframe sets. Inside a measurement subframe set, the terminal device may choose to perform filtering or not to perform filtering, to avoid a case in which channels of different antennas of the network device cannot be distinguished because the terminal device filters all reference signals instead of performing distinction, and to ensure that the network device can obtain a relatively large transmit antenna gain.

In a possible implementation, a total quantity of antennas corresponding to reference signals sent by the network device is a quantity of antennas of the network device, and the sent reference signals include the first reference signal and the second reference signal.

A third aspect of the embodiments provides a communications apparatus. The communications apparatus may be a network device or may be an apparatus that can support a network device in performing corresponding functions performed by the network device in the implementation example of the first aspect. For example, the apparatus may be an apparatus or a chip system in a network device. The apparatus may include a sending module, a receiving module, and a processing module. These modules may perform the corresponding functions performed by the network device in the implementation example of the first aspect. Details are as follows.

The sending module is configured to send a first reference signal to a terminal device through a first port in a first preset subframe corresponding to a first antenna and send a second reference signal to the terminal device through the first port in a second preset subframe corresponding to a second antenna.

The receiving module is configured to receive first measurement information and second measurement information that are sent by the terminal device.

The processing module is configured to determine an antenna weight based on the first measurement information and the second measurement information.

In a possible implementation, for specific processing of the receiving module and the processing module, refer to the specific descriptions in the first aspect. This is not limited herein.

A fourth aspect of the embodiments provides a communications apparatus. The communications apparatus may be a terminal device or may be an apparatus that can support a terminal device in performing corresponding functions performed by the terminal device in the implementation example of the second aspect. For example, the apparatus may be an apparatus or a chip system in a terminal device. The apparatus may include a receiving module, a processing module, and a sending module. These modules may perform the corresponding functions performed by the terminal device in the implementation example of the second aspect. Details are as follows.

The receiving module is configured to receive a first reference signal and a second reference signal that are sent by a network device. The first reference signal is sent by the network device through a first port in a first preset subframe corresponding to a first antenna, and the second reference signal is sent by the network device through the first port in a second preset subframe corresponding to a second antenna.

The processing module is configured to measure the first reference signal and the second reference signal based on the first preset subframe and the second preset subframe, to obtain first measurement information corresponding to the first reference signal and second measurement information corresponding to the second reference signal.

The sending module is configured to send the first measurement information and the second measurement information to the network device.

In a possible implementation, for specific processing of the processing module and the sending module, refer to the specific descriptions in the first aspect. This is not limited herein.

A fifth aspect of the embodiments provides a network device. The network device includes a processor, configured to implement functions of the network device in the method described in the first aspect. The network device may further include a memory, configured to store a program instruction and data. The memory is coupled to the processor. The processor may invoke and execute the program instruction stored in the memory, to implement the functions of the network device in the method described in the first aspect. The network device may further include a communications interface. The communications interface is used by the network device to communicate with another device. For example, the another device is a terminal device.

In a possible implementation, the network device includes:

a communications interface;

a memory, configured to store a program instruction; and a processor, configured to: send a first reference signal to a terminal device through a first port in a first preset subframe corresponding to a first antenna, and send a second reference signal to the terminal device through the first port in a second preset subframe corresponding to a second antenna; receive first measurement information and second measurement information that are sent by the terminal device; and determine an antenna weight based on the first measurement information and the second measurement information.

In a possible implementation, for a method for receiving the first measurement information, refer to the specific descriptions in the first aspect. This is not limited herein.

A sixth aspect of the embodiments provides a terminal device. The terminal device includes a processor, configured to implement functions of the terminal device in the method described in the second aspect. The terminal device may further include a memory, configured to store a program instruction and data. The memory is coupled to the processor. The processor may invoke and execute the program instruction stored in the memory, to implement the functions of the terminal device in the method described in the second aspect. The terminal device may further include a communications interface. The communications interface is used by the terminal device to communicate with another device. For example, the another device is a network device.

In a possible implementation, the terminal device includes:

a communications interface;

a memory, configured to store a program instruction; and a processor, configured to: receive a first reference signal and a second reference signal that are sent by a network device, where the first reference signal is sent by the network device through a first port in a first preset subframe corresponding to a first antenna, and the second reference signal is sent by the network device through the first port in a second preset subframe corresponding to a second antenna; measure the first reference signal and the second reference signal based on the first preset subframe and the second preset subframe, to obtain first measurement information corresponding to the first reference signal and second measurement information corresponding to the second reference signal; and send the first measurement information and the second measurement information to the network device.

In a possible implementation, for a method for measuring the first reference signal and the second reference signal, refer to the specific descriptions in the second aspect. This is not limited herein.

A seventh aspect of the embodiments provides a chip system. The chip system includes a processor, may further include a memory, may further include a communications interface, and is configured to implement functions of the network device or the terminal device in the foregoing methods. The chip system may include a chip or may include a chip and another discrete component.

An eighth aspect of the embodiments provides a computer program product. The computer program product includes computer program code. When the computer program code is executed by a computer, the computer is enabled to perform the method according to the first aspect, or the computer is enabled to perform the method according to the second aspect.

A ninth aspect of the embodiments provides a computer-readable storage medium. The computer storage medium stores a computer instruction. When the computer instruction is executed by a computer, the computer is enabled to perform the method according to the first aspect or the second aspect.

A tenth aspect of the embodiments provides a system. The system includes the communications apparatus according to the fifth aspect and the communications apparatus according to the sixth aspect.

DETAILED DESCRIPTION OF THE EMBODIMENTS

In the embodiments, "a plurality of" refers to two or more than two. "And/or" describes an association relationship for describing associated objects and represents that three relationships may exist. For example, A and/or B may represent the following three cases: only A exists, both A and B exist, and only B exists, where A and B may be singular or plural. The character "/" generally indicates an "or" relationship between the associated objects.

When a quantity of antenna ports of a network device is less than a total quantity of antennas, a precoding matrix gain obtained by the network device is reduced.

To resolve the foregoing problem, in a possible implementation, a time-varying weight may be added to a channel state information reference signal (CSI-RS) pilot in a pilot weighted reconstruction manner, so that all antennas of a network device have an opportunity to be used to send a CSI-RS.

Figure 1:
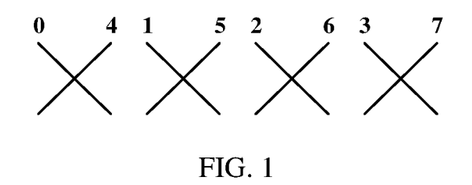
FIG. 1 is a schematic diagram of a mapping relationship between a port and an antenna of a network device.

A mapping relationship between a port and an antenna of a network device shown in FIG. 1 is used as an example. The network device has eight antennas and four ports. Antennas 0 and 4 are mapped to a same antenna port, antennas 1 and 5 are mapped to a same antenna port, antennas 2 and 6 are mapped to a same antenna port, and antennas 3 and 7 are mapped to a same antenna port. When the foregoing method is applied to the network device, based on time-varying weights of pilots, a CSI-RS may be sent by using the four antennas 0, 3, 4, and 7 in some time, and a CSI-RS may be sent by using the four antennas 1, 2, 5, and 6 in other time. A terminal device only learns that the network device sends the CSI-RSs through the four ports, but cannot learn that the network device sends the CSI-RSs by mapping the eight antennas to the four ports. The terminal device may measure a received CSI-RS and report the measured CSI to the network device.

However, in the foregoing method, because the terminal device cannot learn that the network device sends the CSI-RSs by mapping the eight antennas to the four ports, that is, the terminal device only considers that the network device sends the CSI-RSs through the four ports, the terminal device may filter the received CSI-RS. Consequently, channels of different antennas of the network device cannot be distinguished, and further the network device cannot determine an accurate antenna weight. In other words, the network device still cannot obtain a relatively large transmit antenna gain.

The solutions provided in the embodiments are intended to resolve the foregoing problem.

Figure 2:
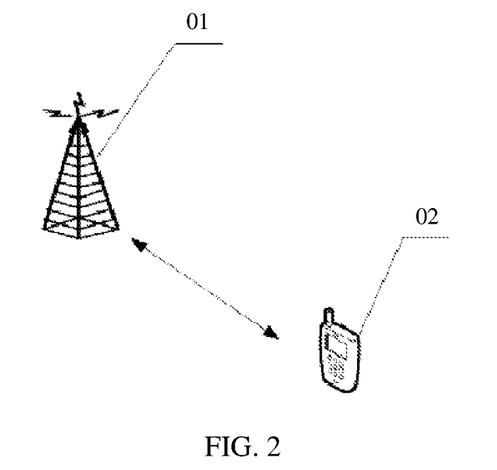
FIG. 2 is a schematic system architecture diagram of a communication method according to an embodiment.

FIG. 2 is a schematic system architecture diagram of a communication method according to an embodiment. As shown in FIG. 2, the method relates to communication between a network device 01 and a terminal device 02.

The terminal device 02 in this embodiment may be a device that provides a user with voice and/or data connectivity, a handheld device having a wireless connection function, or another processing device connected to a wireless modem. The terminal device 02 may communicate with one or more core networks through a radio access network (RAN). The terminal device 02 may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the terminal device 02 may be a personal communications service ( ) telephone, a cordless telephone, a session initiation protocol (SIP) telephone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal device in a future evolved public land mobile network (PLMN), or the like. This is not limited in the embodiments. The terminal device 02 may also be referred to as a system, a subscriber unit, a subscriber station, a mobile station, a mobile, a remote station, an access point, a remote terminal device (remote terminal), an access terminal device (access terminal), a user terminal device (user terminal), a user agent, a user device, or user equipment.

In the embodiments, the network device 01 may be a base station. The base station may be a device that is deployed in the radio access network and that can perform wireless communication with a terminal device. The base station may be configured to perform conversion between a received over-the-air frame and an internet protocol (IP) packet and serve as a router between the terminal device and a remaining part of the access network, where the remaining part of the access network may include an IP network. The base station may further coordinate attribute management of an air interface. For example, the base station may be a base transceiver station (BTS) in a global system for mobile communications (GSM) or code division multiple access (CDMA), or may be a NodeB in wideband code division multiple access (WCDMA), or may be an evolved NodeB (eNB, e-NodeB, or evolutional Node B) in LTE, or may be a gNB in NR, or the like. Alternatively, the base station may be a radio controller in a cloud radio access network (CRAN) scenario, or may be a relay station, an access point, a vehicle-mounted device, a wearable device, a network device in a 5G network, a network device in a future evolved PLMN network, or the like. This is not limited in the embodiments.

In addition, the base station may be a macro base station or may be a micro base station.

The method in the embodiments is applicable to both homogeneous and heterogeneous networks. In addition, there is no limitation on a transmission point. For example, multi-point coordinated transmission between macro base stations, between micro base stations, and between a macro base station and a micro base station may be supported. In addition, the method in the embodiments may be applied to a frequency division duplex (FDD) system or may be applied to a time division duplex ( ) system. In addition, the method in the embodiments is also applicable to a low-frequency scenario (below 6 GHz) and a high-frequency scenario (above 6 GHz).

Figure 3:
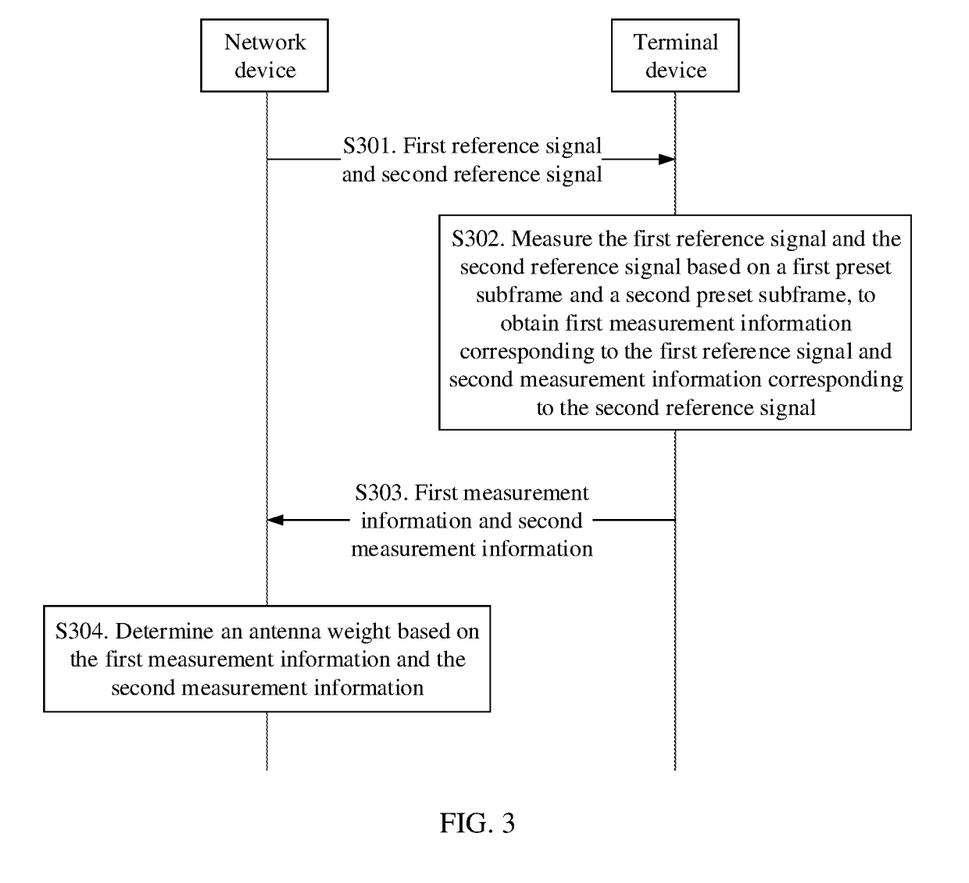
FIG. 3 is a diagram of an interaction procedure of a communication method according to an embodiment.

FIG. 3 is a diagram of an interaction procedure of a communication method according to an embodiment. As shown in FIG. 3, the interaction procedure of the method is as follows:

S301. A network device sends a first reference signal to a terminal device through a first port in a first preset subframe corresponding to a first antenna, and sends a second reference signal to the terminal device through the first port in a second preset subframe corresponding to a second antenna.

A sending sequence of the first reference signal and the second reference signal is not limited in this embodiment.

Optionally, the first port is a transmit port that can be learned by the terminal device. For the first port, the network device may map the first antenna and the second antenna to the first port. In addition, the first antenna corresponds to the first preset subframe, and the second antenna corresponds to the second preset subframe. In other words, a reference signal sent by using the first antenna is sent in the first preset subframe, and a reference signal sent by using the second antenna is sent in the second preset subframe. In addition, the first reference signal is sent by using the first antenna, and the second reference signal is sent by using the second antenna. That is, the first antenna corresponds to the first reference signal, and the second antenna corresponds to the second reference signal.

Optionally, the first reference signal and the second reference signal may be a same reference signal or may be different reference signals.

Optionally, for an antenna of the network device, there is a preset correspondence between the antenna, a to-be-sent reference signal, and a subframe in which the reference signal is sent.

Optionally, the correspondence between the antenna, the reference signal, and the subframe may be a fixed correspondence, or may be a preset correspondence. This is not limited in this embodiment.

For example, a mapping relationship between a port and an antenna of the network device shown in FIG. 1 is used as an example. For the network device, a reference signal A to be sent by using the four antennas, namely, 0, 3, 4, and 7, may be pre-configured to be transmitted in a subframe t1, and a reference signal B to be sent by using the four antennas, namely, 1, 2, 5, and 6, may be pre-configured to be transmitted in a subframe t2. Therefore, there is a correspondence between the subframe t1, the antennas 0, 3, 4, and 7, and the reference signal A, and there is a correspondence between the subframe t2, the antennas 1, 2, 5, and 6, and the reference signal B.

In a specific implementation process, the network device may have a plurality of antennas, and the first antenna and the second antenna may be two of the plurality of antennas. Correspondingly, all or some of reference signals sent by using the plurality of antennas may be the same. This is not limited in this embodiment.

Optionally, the reference signal may be the foregoing CSI-RS, or may be another reference signal, for example, a synchronization signal (SS). This is not limited in this embodiment.

The terminal device may determine, based on a subframe for sending the reference signal, whether to filter the received reference signal.

S302. The terminal device measures the first reference signal and the second reference signal based on the first preset subframe and the second preset subframe, to obtain first measurement information corresponding to the first reference signal and second measurement information corresponding to the second reference signal.

Optionally, because there is a preset correspondence between an antenna and a subframe of the network device, the terminal device may indirectly learn, based on the first preset subframe in which the first reference signal is sent and the second preset subframe in which the second reference signal is sent, of an antenna from which a reference signal is sent, and then determine to perform filtering-based measurement or non-filtering-based measurement on the first reference signal and the second reference signal.

For example, if the terminal device determines to perform filtering-based measurement on the first reference signal and the second reference signal, the terminal device may perform alpha mean filtering on measurement information of the first reference signal and measurement information of the second reference signal, to obtain the same first measurement information and second measurement information that are to be fed back to the network device.

For example, if the terminal device determines to perform non-filtering-based measurement on the first reference signal and the second reference signal, the terminal device may directly feed back the first measurement information of the first reference signal and the second measurement information of the second reference signal to the network device.

Optionally, measurement information obtained by the terminal device by measuring a reference signal may include: a precoding matrix indicator (PMI), a rank indication (RI), and a channel quality indicator (CQI).

The PMI is used to indicate a precoding matrix recommended by the terminal device. The RI is used to indicate a quantity of layers of data, that is recommended by UE, to be simultaneously transmitted by a base station on a same time-frequency resource. The CQI is used to indicate a modulation and coding scheme recommended by the UE.

S303. The terminal device sends the first measurement information and the second measurement information to the network device.

S304. The network device determines an antenna weight based on the first measurement information and the second measurement information.

Optionally, the network device may determine the antenna weight based on the PMI in the measurement information reported by the terminal device.

For example, a mapping relationship between a port and an antenna of the network device shown in FIG. 1 is used as an example. It is assumed that the network device sends a reference signal A by using the four antennas 0, 3, 4, and 7, and sends a reference signal B by using the four antennas 1, 2, 5, and 6. That is, the network device sends two reference signals to the terminal device. Correspondingly, the terminal device reports two pieces of measurement information to the network device. The two pieces of measurement information each include a PMI. Assuming that a PMI of the four antennas 0, 3, 4, and 7 is $$P = \begin{bmatrix} p_0 \\ p_1 \\ p_2 \\ p_3 \end{bmatrix},$$

and a PMI of the four antennas 1, 2, 5, and 6 is $$P' = \begin{bmatrix} p'_0 \\ p'_1 \\ p'_2 \\ p'_3 \end{bmatrix}.$$

In this case, weights of all the eight antennas of the network device may be determined according to the following formulas (1) to (5):

$$wgt = \mu_{cr} \otimes \mu_{co} \qquad (1)$$

where $\mu_{cr}$: 2×1, representing cross-polarization information, and $\mu_{co}$: 4×1, representing co-polarization information;

$$R_{co} = \begin{bmatrix} p_0 * conj(p_0) + p_2 * conj(p_2) & 0 & 0 & p_0 * conj(p_1) + p_2 * conj(p_2) \\ 0 & p'_0 * conj(p'_0) + p'_2 * conj(p'_2) & p'_0 * conj(p'_1) + p'_2 * conj(p'_3) & 0 \\ 0 & p'_1 * conj(p'_0) + p'_3 * conj(p'_2) & p'_1 * conj(p'_1) + p'_3 * conj(p'_3) & 0 \\ p_1 * conj(p_0) + p_3 * conj(p_2) & 0 & 0 & p_1 * conj(p_1) + p_3 * conj(p_3) \end{bmatrix} \qquad (2)$$

$$\mu_{co} = \max_{d(\theta)} d(\theta)^H R_{co} d(\theta) \qquad (3)$$

where $$d(\theta) = \begin{bmatrix} e^{j0\theta} \\ e^{j1\theta} \\ e^{j2\theta} \\ e^{j3\theta} \end{bmatrix};$$

$$R_{cr} = \begin{bmatrix} p'_0 * conj(p'_0) + p'_1 * conj(p'_1) + p_0 * conj(p_0) + p_1 * conj(p_1) & p'_0 * conj(p'_2) + p'_1 * conj(p'_3) + p_0 * conj(p_2) + p_1 * conj(p_3) \\ p'_2 * conj(p'_0) + p'_3 * conj(p'_1) + p_2 * conj(p_0) + p_3 * conj(p_1) & p'_2 * conj(p'_2) + p'_3 * conj(p'_3) + p_0 * conj(p_2) + p_1 * conj(p_3) \end{bmatrix} \qquad (4)$$

$$[u, s, v] = SVD(R_{cr}) \qquad (5)$$

$$\mu_{cr} = u(:, 1) \qquad (6)$$

Further, the network device may further weight a physical downlink shared channel (PDSCH) of the terminal device by using the obtained antenna weights.

In this embodiment, the network device sends a reference signal in a preset subframe corresponding to an antenna. After receiving the reference signal, the terminal device may determine, based on the subframe in which the reference signal is sent, whether to filter the received reference signal. That is, the terminal device may indirectly learn, based on the subframe in which the reference signal is sent, of antennas using which the reference signal is sent, and then determine whether to filter the reference signal. In this way, a problem that channels of different antennas of the network device cannot be distinguished because the terminal device filters reference signals is avoided. This ensures that the network device can obtain a relatively large transmit antenna gain.

In an optional implementation, the first preset subframe is a subframe in a first measurement subframe set, and the first measurement subframe set includes a plurality of subframes.

The second preset subframe may be a subframe in the first measurement subframe set or may be a subframe in a measurement subframe set other than the first measurement subframe set.

Optionally, the first measurement subframe set may be a fixed subframe set or may be a pre-configured subframe set.

Optionally, subframes included in a measurement subframe set and a correspondence between an antenna and the measurement subframe set may be pre-configured.

Figure 4:
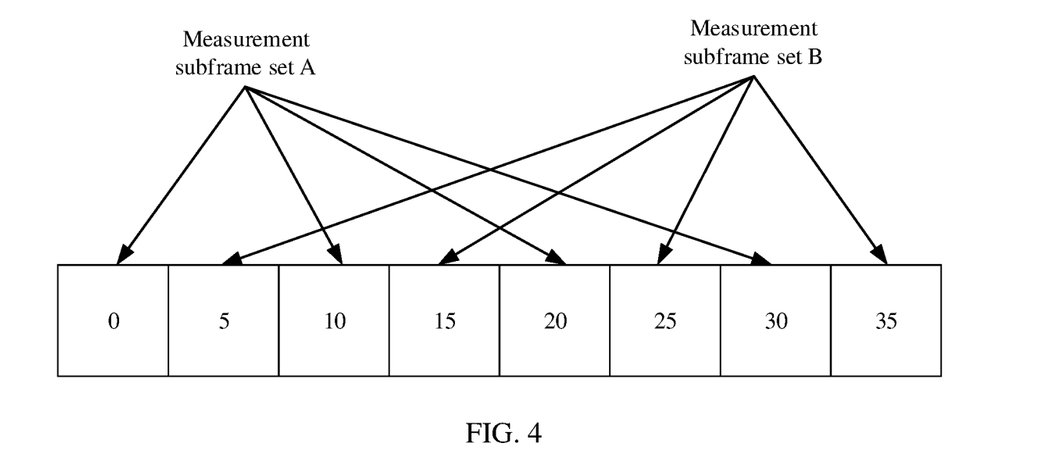
FIG. 4 is a schematic diagram of subframes included in a measurement subframe set.

FIG. 4 is a schematic diagram of subframes included in a measurement subframe set. As shown in FIG. 4, there are two measurement subframe sets, which are a measurement subframe set A and a measurement subframe set B. The measurement subframe set A includes four subframes: a subframe 0, a subframe 10, a subframe 20, and a subframe 30, and the measurement subframe set B includes four subframes: a subframe 5, a subframe 15, a subframe 25, and a subframe 35.

Figure 5:
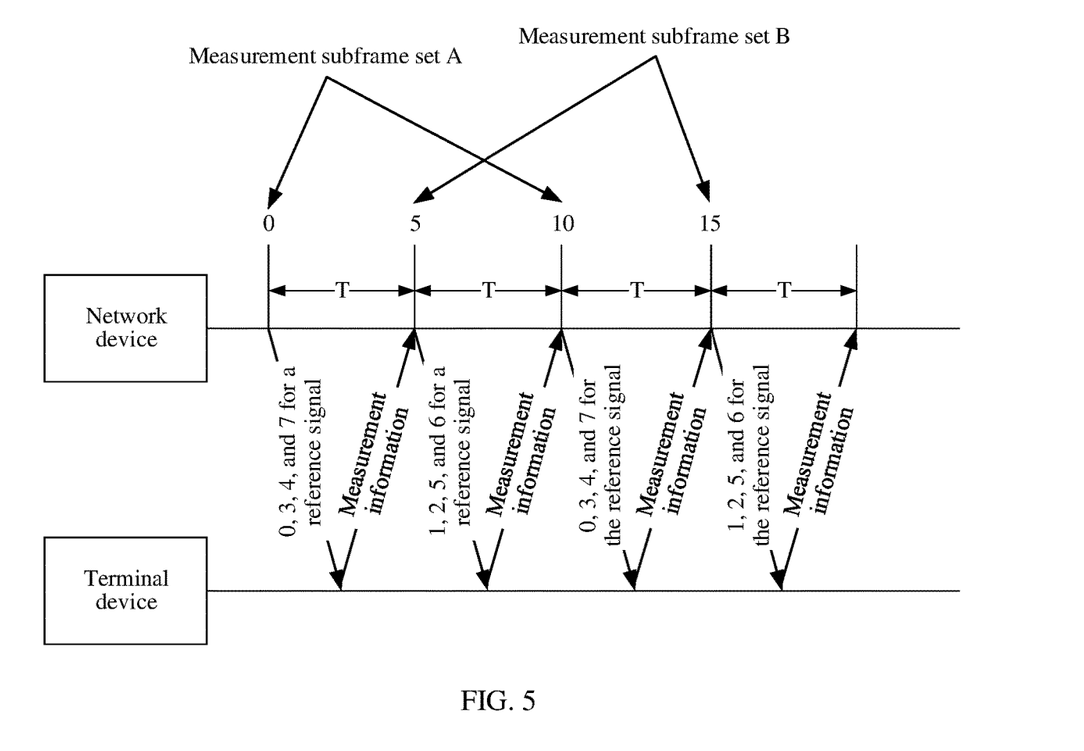
FIG. 5 is a schematic diagram of sending a reference signal based on a measurement subframe set.

FIG. 5 is a schematic diagram of sending a reference signal based on a measurement subframe set. As shown in FIG. 5, it is assumed that the measurement subframe set is the measurement subframe set shown in FIG. 4, a mapping relationship between a port and an antenna of a network device is the mapping relationship shown in FIG. 1, and it is pre-configured that four antennas 0, 3, 4, and 7 correspond to a measurement subframe set A and four ports 1, 2, 5, and 6 correspond to a measurement subframe set B. In this case, the measurement subframe set A and the measurement subframe set B may be used to send a reference signal in an alternating manner. For example, reference signals sent by using the four antennas 0, 3, 4, and 7 are sent in a subframe 0. Reference signals sent by using the four antennas 1, 2, 5, and 6 are sent in a subframe 5.

T shown in FIG. 5 is a time interval between two subframes for sending a reference signal, and T is an integer multiple of a sending periodicity of the reference signal. For example, T may be 5 milliseconds.

Based on the correspondence between the first preset subframe and the first measurement subframe set, on a terminal device side, after receiving the first reference signal and the second reference signal, the terminal device may determine, based on a measurement subframe set to which the first preset subframe belongs and a measurement subframe set to which the second preset subframe belongs, to perform filtering-based measurement or non-filtering-based measurement on the first reference signal and the second reference signal.

In a case, if the first preset subframe and the second preset subframe belong to different measurement subframe sets, for example, the first preset subframe belongs to the first measurement subframe set, and the second preset subframe belongs to a second measurement subframe set different from the first measurement subframe set, the terminal device may determine to perform non-filtering-based measurement on the first reference signal and the second reference signal. That is, the terminal device does not perform filtering between the different measurement subframe sets.

In another case, if the first preset subframe and the second preset subframe belong to a same measurement subframe set, for example, both the first preset subframe and the second preset subframe belong to the first measurement subframe set, the terminal device may determine to perform non-filtering-based measurement or filtering-based measurement on the first reference signal and the second reference signal. That is, the terminal device may choose to perform filtering or not to perform filtering inside the same measurement subframe set. This is not limited in this embodiment.

In this embodiment, the terminal device may indirectly learn, based on a measurement subframe set to which a subframe for sending a reference signal belongs and by using a correspondence between the subframe and the measurement subframe set, of an antenna for sending the reference signal. Then, the terminal device may choose not to filter reference signals belonging to different measurement subframe sets. Inside a measurement subframe set, the terminal device may choose to perform filtering or not to perform filtering, to avoid a case in which channels of different antennas of the network device cannot be distinguished because the terminal device filters all reference signals instead of performing distinction, and to ensure that the network device can obtain a relatively large transmit antenna gain.

Optionally, a total quantity of antennas corresponding to reference signals sent by the network device is a quantity of antennas of the network device. The sent reference signals include the first reference signal and the second reference signal.

Optionally, antennas corresponding to reference signals sent by the network device may also be a part of antennas of the network device.

In an optional implementation, the first measurement subframe set is one of N measurement subframe sets.

Optionally, the network device may first determine N based on a relationship between an antenna and a transmit port.

The network device shown in FIG. 1 is used as an example. The network device includes eight antennas and four ports. In this case, the network device may determine that N is equal to 2. To be specific, two reference signals are used to separately correspond to four antennas in the eight antennas in this example.

In this embodiment, on a basis that the network device determines N, the network device may determine that a quantity of measurement subframe sets is N, so that antennas corresponding to each reference signal have a unique corresponding measurement subframe set.

For example, the network device shown in FIG. 1 is used as an example. The network device determines that N is 2. To be specific, one reference signal is sent by using the four antennas 0, 3, 4, and 7, and the other reference signal is sent on the four antennas 1, 2, 5, and 6 in this example. In addition, the network device determines two measurement subframe sets, where one measurement subframe set corresponds to the four antennas 0, 3, 4, and 7, and the other measurement subframe set corresponds to the four antennas 1, 2, 5, and 6. In this way, the antennas corresponding to each of the two reference signals have a unique corresponding measurement subframe set.

In this embodiment, the N measurement subframe sets are provided, so that the antennas corresponding to each reference signal of the network device have a unique corresponding measurement subframe set. The terminal device may indirectly learn, based on a measurement subframe set to which a subframe for sending a reference signal belongs, of an antenna for sending the reference signal. Then, the terminal device may choose not to filter reference signals of different measurement subframe sets. Inside a measurement subframe set, the terminal device may choose to perform filtering or not to perform filtering, to avoid a case in which channels of different antenna ports of the network device cannot be distinguished because the terminal device filters all reference signals instead of performing distinction, and to ensure that the network device can obtain a relatively large transmit antenna gain.

In a specific implementation process, the foregoing measurement subframe set may be pre-negotiated and pre-configured by the network device and the terminal device.

Optionally, if the measurement subframe set is pre-negotiated and pre-configured by the network device and the terminal device, the network device may pre-determine, based on the configuration, a quantity of measurement subframe sets and subframes included in each measurement subframe set, and send the information to the terminal device by using a specific message. The terminal device determines, based on the information, whether to filter a reference signal.

The following uses an implementation process in the LTE R10 as an example to describe a process of determining a measurement subframe set in this embodiment.

In the protocol of the LTE R10, two measurement subframe sets are provided: a csi-MeasSubframeSet1-r10 and a csi-MeasSubframeSet2-r10. The network device may configure the two measurement subframes. For example, the network device configures the csi-MeasSubframeSet1-r10 to include subframes 0, 10, 20, and 30, and configures the csi-MeasSubframeSet2-r10 to include subframes 5, 15, 25, and 35. The network device sends configuration information of the two measurement subframe sets to the terminal device. Then, the terminal device may not filter, based on the two measurement subframe sets, reference signals belonging to different measurement subframe sets, and filter or not filter reference signals belonging to a same measurement subframe set.

Based on the foregoing embodiment, the embodiments relate to a process in which the terminal device sends measurement information and the network device obtains the measurement information.

Figure 6:
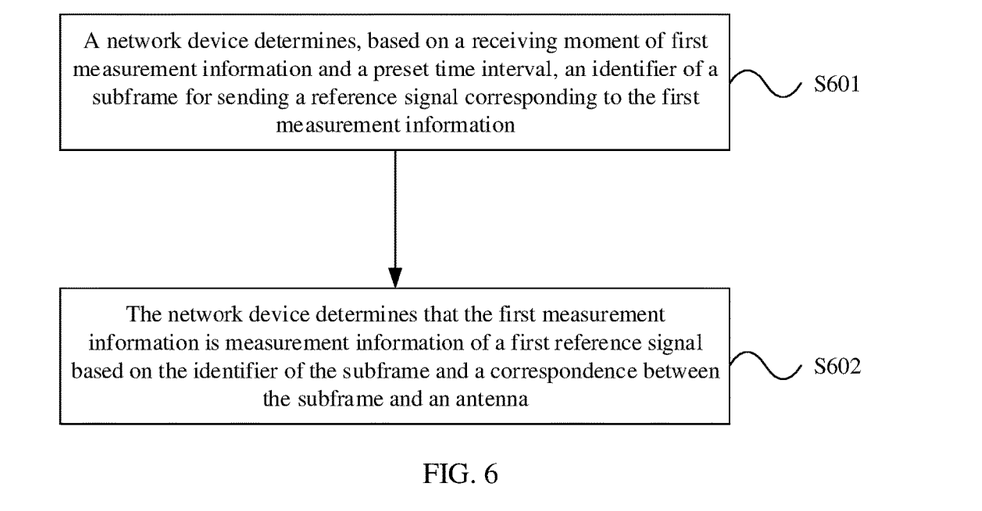
FIG. 6 is a schematic flowchart of a communication method according to an embodiment.

FIG. 6 is a schematic flowchart of a communication method according to an embodiment. As shown in FIG. 6, a network device may determine, in the following process, measurement information corresponding to a reference signal.

S601. The network device determines, based on a receiving moment of first measurement information and a preset time interval, an identifier of a subframe for sending a reference signal corresponding to the first measurement information.

Optionally, the time interval may be a time interval between a time at which a terminal device measures the reference signal and a time at which the measurement information is fed back.

Optionally, assuming that a moment at which the network device receives the first measurement information is s, and the preset time interval is Δ, searching is performed forward from a moment "s-Δ" (including the current moment), and a closest subframe is the subframe for sending the reference signal corresponding to the first measurement information. The moment s may be an identifier of a subframe, and the moment "s-Δ" may also be an identifier of a subframe.

S602. The network device determines that the first measurement information is the measurement information of the first reference signal based on the identifier of the subframe and a correspondence between the subframe and an antenna.

Optionally, after determining the identifier of the subframe, the network device may determine, based on pre-configured measurement subframe sets, a measurement subframe set to which the subframe corresponding to the identifier of the subframe belongs, and then determine, based on a correspondence between the measurement subframe set and an antenna, that the first measurement information is measurement information of a reference signal sent by which antenna.

It should be noted that, the first measurement information and the first reference signal described in this embodiment are not limited to a specific piece of measurement information or a specific reference signal, and that the first measurement information is the measurement information of the first reference signal only indicates that a reference signal has measurement information corresponding to the first reference signal, but does not indicate that the measurement information of the first reference signal is a fixed piece of measurement information.

Further, the network device may determine an antenna weight of the network device based on the measurement information of the first reference signal and measurement information of another reference signal.

Correspondingly, on a terminal device side, the terminal device may send the first measurement information to the network device based on a receiving moment of the first reference signal and a preset time interval.

The preset time interval has a same meaning as that in step S601, and details are not described herein again.

Optionally, assuming that a moment at which the terminal device receives the first reference signal is t, the terminal device reports, from a moment "t+Δ", the first measurement information of the first reference signal to the network device on an uplink feedback resource provided that the terminal device obtains the uplink feedback resource.

In the foregoing embodiments, the methods provided in the embodiments are separately described from perspectives of the network device, the terminal device, and interaction between the network device and the terminal device. To implement functions in the foregoing methods provided in the embodiments, the network device and the terminal device may include a hardware structure and/or a software module and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the solutions.

Figure 7:
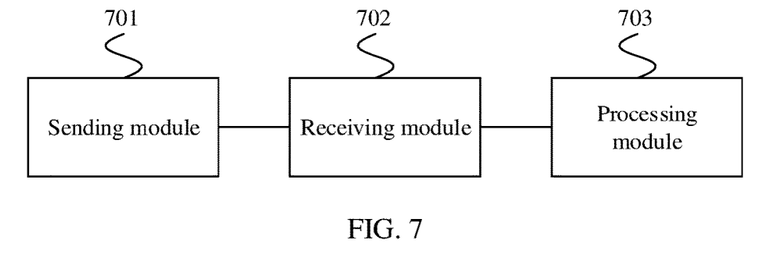
FIG. 7 is a module structure diagram of a communications apparatus according to an embodiment.

FIG. 7 is a module structure diagram of a communications apparatus according to an embodiment. The apparatus may be a network device. Alternatively, the apparatus may be an apparatus that can support a network device in implementing a function of the network device in the method provided in the embodiments. For example, the apparatus may be an apparatus or a chip system in the network device. As shown in FIG. 7, the apparatus includes a sending module 701, a receiving module 702, and a processing module 703. In this embodiment, the chip system may include a chip, or may include a chip and another discrete component.

The sending module 701 is configured to send a first reference signal to a terminal device through a first port in a first preset subframe corresponding to a first antenna, and send a second reference signal to the terminal device through the first port in a second preset subframe corresponding to a second antenna.

The receiving module 702 is configured to receive first measurement information and second measurement information that are sent by the terminal device, where the first measurement information is measurement information of the first reference signal, and the second measurement information is measurement information of the second reference signal.

The processing module 703 is configured to determine an antenna weight based on the first measurement information and the second measurement information.

In a possible implementation, the first preset subframe is a subframe in a first measurement subframe set, and the first measurement subframe set includes a plurality of subframes.

In a possible implementation, the receiving module 702 may be configured to:

determine, based on a receiving moment of the first measurement information and a preset time interval, an identifier of a subframe for sending a reference signal corresponding to the first measurement information; and determine that the first measurement information is the measurement information of the first reference signal based on the identifier of the subframe and a correspondence between the subframe and an antenna.

In an example, a total quantity of antennas corresponding to reference signals sent by the apparatus is a quantity of antennas of the network device, and the sent reference signals include the first reference signal and the second reference signal.

In an example, the measurement information includes a PMI.

In a possible implementation, the processing module 703 is further configured to:

weight a PDSCH of the terminal device by using the antenna weight.

Figure 8:
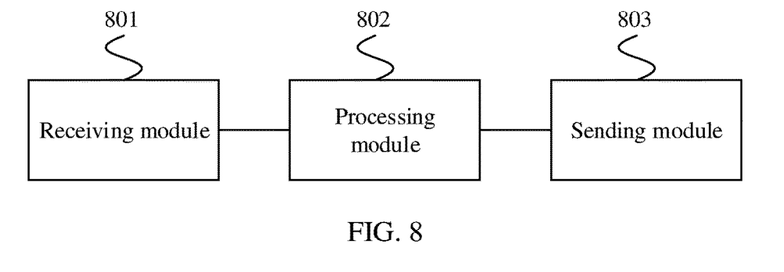
FIG. 8 is a module structure diagram of another communications apparatus according to an embodiment.

FIG. 8 is a module structure diagram of another communications apparatus according to an embodiment. The apparatus may be a terminal device. Alternatively, the apparatus may be an apparatus that can support a terminal device in implementing a function of the terminal device in the methods provided in the embodiments. For example, the apparatus may be an apparatus or a chip system in the terminal device. As shown in FIG. 8, the apparatus includes a receiving module 801, a processing module 802, and a sending module 803. In this embodiment, the chip system may include a chip, or may include a chip and another discrete component.

The receiving module 801 is configured to receive a first reference signal and a second reference signal that are sent by a network device. The first reference signal is sent by the network device through a first port in a first preset subframe corresponding to a first antenna, and the second reference signal is sent by the network device through the first port in a second preset subframe corresponding to a second antenna.

The processing module 802 is configured to measure the first reference signal and the second reference signal based on the first preset subframe and the second preset subframe, to obtain first measurement information corresponding to the first reference signal and second measurement information corresponding to the second reference signal.

The sending module 803 is configured to send the first measurement information and the second measurement information to the network device.

In a possible implementation, the first preset subframe is a subframe in a first measurement subframe set, and the first measurement subframe set includes a plurality of subframes.

In a possible implementation, the processing module 802 may be configured to:

determine, based on the measurement subframe set to which the first preset subframe belongs and a measurement subframe set to which the second preset subframe belongs, to perform filtering-based measurement or non-filtering-based measurement on the first reference signal and the second reference signal.

In a possible implementation, the sending module 803 may be configured to:

send the first measurement information to the network device based on a receiving moment of the first reference signal and a preset time interval.

In an example, a total quantity of antennas corresponding to reference signals sent by the apparatus is a quantity of antennas of the network device, and the sent reference signals include the first reference signal and the second reference signal.

In the embodiments, division into modules is an example, and is merely logical function division. During actual implementation, there may be another division manner. In addition, in each embodiment, functional modules may be integrated into one processor, or each of the modules may exist alone physically, or two or more modules may be integrated into one module. The integrated module may be implemented in a form of hardware or may be implemented in a form of a software functional module.

Figure 9:
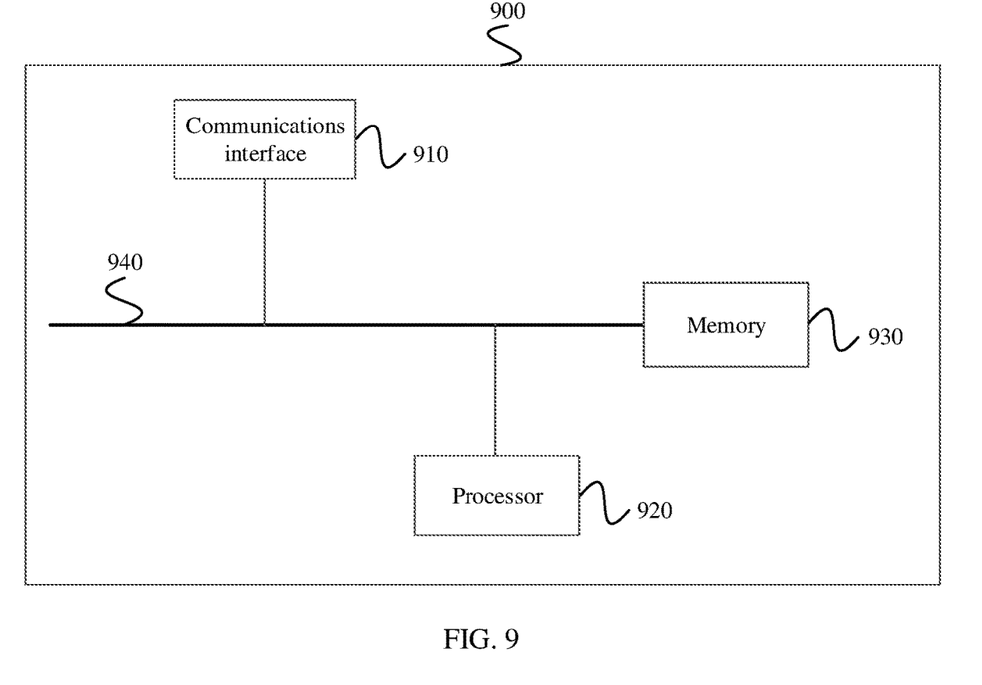
FIG. 9 is a block diagram of a network device 900 according to an embodiment.

FIG. 9 shows a network device 900 according to an embodiment, and the network device 900 is configured to implement a function of the network device in the foregoing methods. The network device 900 includes at least one processor 920, configured to implement the function of the network device in the methods provided in the embodiments. For example, the processor 920 may send a first reference signal to a terminal device through a first port in a first preset subframe corresponding to a first antenna, and send a second reference signal to the terminal device through the first port in a second preset subframe corresponding to a second antenna; receive first measurement information and second measurement information that are sent by the terminal device; and determine an antenna weight based on the first measurement information and the second measurement information. For details, refer to the detailed descriptions in the method examples. Details are not described herein again.

The network device 900 may further include at least one memory 930, configured to store a program instruction and/or data. The memory 930 is coupled to the processor 920. Couplings in the embodiments are indirect couplings or communication connections between apparatuses, units, or modules, may be in an electrical form, a mechanical form, or another form, and are used for information exchange between the apparatuses, the units, or the modules. The processor 920 may operate in collaboration with the memory 930. The processor 920 may execute the program instruction stored in the memory 930. At least one of the at least one memory may be included in the processor.

The network device 900 may further include a communications interface 910, configured to communicate with another device by using a transmission medium, so that an apparatus used in the network device 900 may communicate with another device. In this embodiment, the communications interface may be an interface, in any form, that can perform communication, for example, a module, a circuit, a bus, or a combination thereof. Optionally, the communications interface 910 may be a transceiver. For example, the another device may be a terminal device. The processor 920 receives and sends data through the communications interface 910 and is configured to implement the methods performed by the network device in the foregoing method embodiments.

In this embodiment, a specific connection medium between the communications interface 910, the processor 920, and the memory 930 is not limited. In this embodiment, the memory 930, the processor 920, and the communications interface 910 are connected by using a bus 940 in FIG. 9, and the bus is represented by a thick line in FIG. 9. A connection manner between other components is schematically described and is not limited thereto. The bus may be categorized as an address bus, a data bus, a control bus, and the like. For ease of representation, only one thick line is used to represent the bus in FIG. 9, but this does not mean that there is only one bus or only one type of bus.

Figure 10:
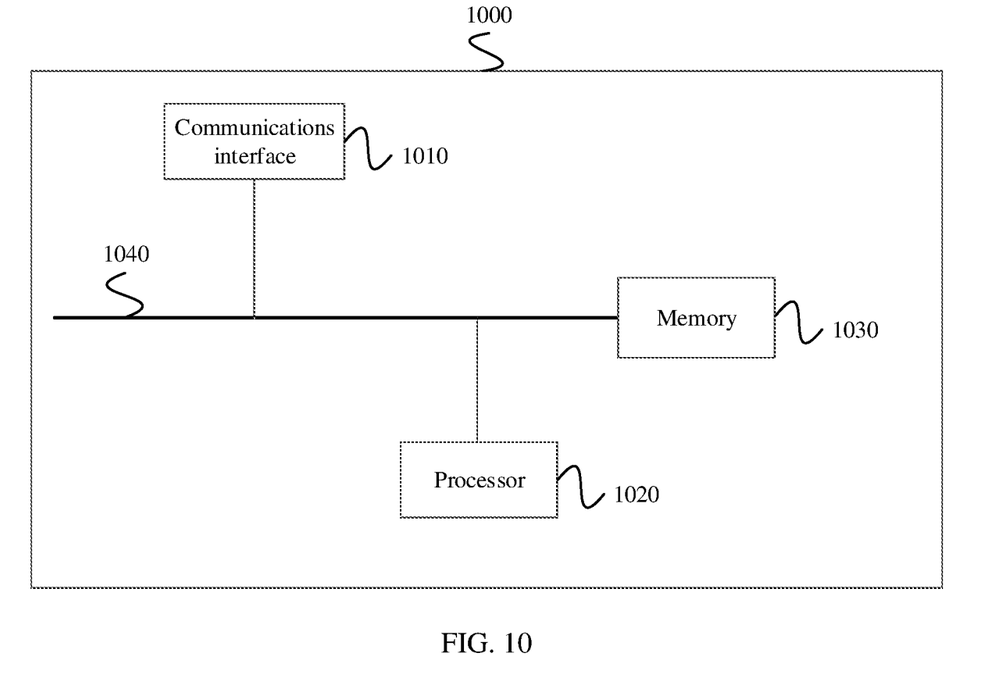
FIG. 10 is a block diagram of a terminal device 1000 according to an embodiment.

FIG. 10 shows a terminal device 1000 according to an embodiment, and the terminal device 1000 is configured to implement a function of the terminal device in the foregoing methods. The terminal device 1000 includes at least one processor 1020, configured to implement a function of the terminal device in the methods provided in the embodiments. For example, the processor 1020 may receive a first reference signal and a second reference signal that are sent by a network device, measure the first reference signal and the second reference signal based on a first preset subframe and a second preset subframe, and send first measurement information and second measurement information to the network device. For details, refer to the detailed descriptions in the method examples. Details are not described herein again.

The terminal device 1000 may further include at least one memory 1030, configured to store a program instruction and/or data. The memory 1030 is coupled to the processor 1020. Couplings in the embodiments are indirect couplings or communication connections between apparatuses, units, or modules, may be in an electrical form, a mechanical form, or another form, and are used for information exchange between the apparatuses, the units, or the modules. The processor 1020 may operate in collaboration with the memory 1030. The processor 1020 may execute the program instruction stored in the memory 1030. At least one of the at least one memory may be included in the processor.

The terminal device 1000 may further include a communications interface 1010, configured to communicate with another device by using a transmission medium, so that an apparatus in the network device 1000 can communicate with the another device. In this embodiment, the communications interface may be an interface, in any form, that can perform communication, for example, a module, a circuit, a bus, or a combination thereof. Optionally, the communications interface 1010 may be a transceiver. For example, the another device may be a network device. The processor 1020 receives and sends data through the communications interface 1010 and is configured to implement the methods performed by the terminal device in the foregoing method embodiments.

In this embodiment, a specific connection medium between the communications interface 1010, the processor 1020, and the memory 1030 is not limited. In this embodiment, the memory 1030, the processor 1020, and the communications interface 1010 are connected by using a bus 1040 in FIG. 10, and the bus is represented by a thick line in FIG. 10. A connection manner between other components is schematically described and is not limited thereto. The bus may be categorized as an address bus, a data bus, a control bus, and the like. For ease of representation, only one thick line is used to represent the bus in FIG. 10, but this does not mean that there is only one bus or only one type of bus.

In the embodiments, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams provided in the embodiments. The general-purpose processor may be a microprocessor or any conventional processor or the like. The steps of the method provided with reference to the embodiments may be directly performed by a hardware processor or may be performed by using a combination of hardware and a software module that are in the processor.

In the embodiments, the memory may be a non-volatile memory, for example, a hard disk (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in the embodiments may alternatively be a circuit or any other apparatus that can implement a storage function and is configured to store a program instruction and/or data.

All or some of the foregoing methods in the embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person of ordinary skill in the art can make various modifications and variations to this application without departing from the scope.

What is claimed is:

1. A communication method, comprising:
   sending, by a network device, a first reference signal to a terminal device through a first port in a first preset subframe corresponding to a first antenna;
   sending, by the network device, a second reference signal to the terminal device through the first port in a second preset subframe corresponding to a second antenna;
   receiving, by the network device, first measurement information and second measurement information that are sent by the terminal device, wherein the first measurement information is measurement information of the first reference signal, and the second measurement information is the measurement information of the second reference signal; and
   determining, by the network device, an antenna weight based on the first measurement information and the second measurement information.

2. The method according to claim 1, wherein the first preset subframe is a subframe in a first measurement subframe set, and the first measurement subframe set comprises a plurality of subframes.

3. The method according to claim 2, wherein the receiving, by the network device, of the first measurement information sent by the terminal device comprises:
   determining, by the network device based on a receiving moment of the first measurement information and a preset time interval, an identifier of a subframe for sending a reference signal corresponding to the first measurement information; and
   determining, by the network device, that the first measurement information is the measurement information of the first reference signal based on the identifier of the subframe and a correspondence between the subframe and an antenna.

4. The method according to claim 1, wherein a total quantity of antennas corresponding to reference signals sent by the network device is a quantity of antennas of the network device, and the sent reference signals comprise the first reference signal and the second reference signal.

5. The method according to claim 1, wherein the measurement information comprises a precoding matrix indicator (PMI).

6. The method according to claim 1, further comprising:
   weighting, by the network device, a physical downlink shared channel (PDSCH) of the terminal device by utilizing the antenna weight.

7. A communications apparatus, comprising:
   a sending module configured to send a first reference signal to a terminal device through a first port in a first preset subframe corresponding to a first antenna and send a second reference signal to the terminal device through the first port in a second preset subframe corresponding to a second antenna;
   a receiving module configured to receive first measurement information and second measurement information that are sent by the terminal device, wherein the first measurement information is measurement information of the first reference signal and the second measurement information is the measurement information of the second reference signal; and
   a processing module configured to determine an antenna weight based on the first measurement information and the second measurement information.

8. The apparatus according to claim 7, wherein the first preset subframe is a subframe in a first measurement subframe set, and the first measurement subframe set comprises a plurality of subframes.

9. The apparatus according to claim 8, wherein the receiving module is configured to:
   determine, based on a receiving moment of the first measurement information and a preset time interval, an identifier of a subframe for sending a reference signal corresponding to the first measurement information; and
   determine that the first measurement information is the measurement information of the first reference signal based on the identifier of the subframe and a correspondence between the subframe and an antenna.

10. The apparatus according to claim 7, wherein a total quantity of antennas corresponding to reference signals sent by the apparatus is a quantity of antennas of the network device, and the sent reference signals comprise the first reference signal and the second reference signal.

11. The apparatus according to claim 7, wherein the measurement information comprises a precoding matrix indicator (PMI).

12. The apparatus according to claim 7, wherein the processing module is further configured to:
   weight a physical downlink shared channel (PDSCH) of the terminal device by utilizing the antenna weight.

13. A communications apparatus, comprising:
    a receiving module configured to receive a first reference signal and a second reference signal that are sent by a network device, wherein the first reference signal is sent by the network device through a first port in a first preset subframe corresponding to a first antenna, and the second reference signal is sent by the network device through the first port in a second preset subframe corresponding to a second antenna;
    a processing module configured to measure the first reference signal and the second reference signal based on the first preset subframe and the second preset subframe respectively, to obtain first measurement information corresponding to the first reference signal and second measurement information corresponding to the second reference signal; and
    a sending module configured to send the first measurement information and the second measurement information to the network device.

14. The apparatus according to claim 13, wherein the first preset subframe is a subframe in a first measurement subframe set, and the first measurement subframe set comprises a plurality of subframes.

15. The apparatus according to claim 14, wherein the processing module is configured to:
    determine, based on a measurement subframe set to which the first preset subframe belongs and a measurement subframe set to which the second preset subframe belongs, to perform filtering-based measurement or non-filtering-based measurement on the first reference signal and the second reference signal.

16. The apparatus according to claim 13, wherein the sending module is configured to:
    send the first measurement information to the network device based on a receiving moment of the first reference signal and a preset time interval.

17. The apparatus according to claim 13, wherein a total quantity of antennas corresponding to reference signals sent by the network device is a quantity of antennas of the network device, and the sent reference signals comprise the first reference signal and the second reference signal.

* * * * *